Patented Sept. 15, 1953

2,652,333

UNITED STATES PATENT OFFICE 2,652,333

METHOD OF MAKING AVAILABLE THE BITTER SUBSTANCES FROM HOPS

Tore Ragnar Nilsson, Bromma, and Knut Evald Sandegren, Stockholm, Sweden

No Drawing. Application December 18, 1950, Serial No. 201,486. In Sweden December 22, 1948

20 Claims. (Cl. 99—50.5)

This invention relates to a new and improved method of making available substantially all of the bitter substances from hops, such bitter substances being intended for use as flavouring agents e. g. in brewing.

In the brewing of beer the hops or extracts of hops have hitherto been boiled with wort. The spent hops are then separated from the solution and thrown away as waste. By this method only part of the original bitter substances of the hops will go into solution and be available for the flavouring of the beer, this part substantially consisting of so called alpha bitter acid, whereas the rest—up to about one half of the original bitter substances of the hops—consisting substantially of so called beta bitter acid becomes wasted.

Now it is the main object of the present invention to make available also the beta bitter substances of hops or hops extract.

In order to gain this main object and other advantages which will be understood from the following description one proceeds as follows, the expression "hops" in the following description as well as in the annexed claims being intended to include natural hops as well as bitter extract from the same.

The hops are first boiled with wort in the way usual in the brewery technic and the spent hops remaining after such boiling are filtered off and suitably washed with water. The residue thus obtained is then according to this invention subjected to a partial or restricted oxidation so as to convert the beta bitter acids of the same into water-soluble soft resins.

The said partial or restricted oxidation can be carried out by aerating or passing oxygen containing gas preferably at somewhat elevated temperature through the moist spent hops while resting in the hops strainer after filtering off from the wort and washing. After such oxidation the water soluble soft resins formed are leached out with a suitable solvent. For this leaching alkaline water preferably of a pH-value of about 9–11 can be used, in which case the liquid obtained can be directly added to the wort, and the wort thus flavoured can be directly fermented. However, also volatile organic solvents which do not react with the soft resin, taken from the group consisting of aliphatic hydrocarbons, halogenated aliphatic hydrocarbons, aliphatic alcohols and ethers may be utilized for leaching out the soft resins formed during the partial or restricted oxidation. Such organic solvents are then driven off and recovered before the soft resins are used e. g. as flavouring agents.

According to another embodiment the said oxidation is carried out with the hops in suspension or solution in a suitable liquid of the kind set forth above. When organic solvents are used for suspending or dissolving, the spent hops are preferably dried before such suspension or dissolving.

As oxidizing agent in the process according to the invention not only oxygen gas or air may be utilized but also oxygen liberating agents such as per compounds, e. g. hydrogen peroxide. In order to accelerate the oxidizing process also catalysts may be added, such catalysts consisting of compounds of at least one of the metals copper, iron, manganese, chromium, cobalt and nickel and preferably such compounds which are insoluble in the solvent used, e. g. oxides or hydroxides.

The oxidation process can also be accelerated by subjecting the reaction mixture to the influence of irradiation and particularly to short wave or actinic light radiation.

When carrying out the process according to the invention it is to be observed that the bitter substances must not be overoxidized which might result in a conversion of the bitter substances into substantially non-soluble hard resins. Practical experiments have shown that oxygen should be added in amounts of about 100–150 molar per cent counted on the amount of beta bitter substances present.

In order better to illustrate the invention but without limiting the same the following examples are given.

Example 1

9.13 g. beta bitter acid were dissolved in 250 ml. of petroleum ether (boiling point 45–55° C.) and the solution was shaken in oxygen atmosphere in a 2 l. bottle with continuous addition of oxygen. When 830 ml. of oxygen at room temperature and atmospheric pressure (corresponding to about 12 per cent by weight) had been absorbed the shaking was terminated and the solution analysed. This analysis showed about 75 per cent of the beta bitter acid to have been oxidized to water soluble soft resin and only 7 per cent transformed to more non-soluble hard resin. After driving off the solvent the residue had a fresh and agreeable hops flavour. This substance dissolved in water gave an intensively bitter taste.

Example 2

In 50 ml. of carbon tetrachloride there were dissolved 2.1 g. of beta bitter acid corresponding to about 40 g. of dried spent hops. The solution was shaken with oxygen at room temperature until the absorption started to decrease. 129 molar per cent (counted on the beta bitter acid) of oxygen had then been absorbed. An analysis of the solution showed that only 7 per cent of the beta acid had been converted to non-desirable hard resins, while the rest had resulted in bitter substances suitable for flavouring beer.

*Example 3*

Hops extract was boiled with wort in the manner usual in the production of beer. That part of the bitter substances which was not dissolved, i. e. beta bitter acid and hard resins, was separated from the solution and dissolved in trichloro ethylene. 100 ml. of trichloro ethylene solution containing 4 g. of beta bitter acid were treated at room temperature with oxygen gas until 147 molar per cent of oxygen (counted on the amount of beta bitter acid) had been absorbed. By this treatment 10 per cent of the beta acid was converted to hard resins, while the rest gave bitter substances suitable for flavouring purposes.

*Example 4*

To a neutralized solution of 1.6 g. beta bitter acid corresponding to about 40 g. dry spent hops in 12 ml. 50 per cent ethanol there was added hydrogen peroxide in such amounts that the solution contained 2 moles of $H_2O_2$ per mole beta acid. The solution was boiled for 10 minutes after which the pH value was decreased to 6. An analyses showed only 3 per cent of the beta acid to have been converted into the non-desirable hard resins. By boiling in water of pH 6 a solution was obtained with agreeable bitter taste and with a content of bitter substances equal to 91 mg. per l.

*Example 5*

19.1 kg. hops containing 11.2 per cent of bitter substances were introduced into 6000 l. of wort of pH=5.2 and heated to boiling for 1½ hours. The spent hops were then separated from the wort and leached with 450 l. of hot water. Then 1100 l. water of 80° C. were added to the said spent hops and 5-N sodium hydroxide solution was added while stirring until the pH value of the solution was raised to between 10 and 11. At the same time the reaction mixture was aerated. During the conversion of the beta acid the pH of the reaction mixture tends to decrease. The temperature was kept between 70 and 80° C. during the reaction period (40 minutes) and sodium hydroxide solution was added in portions so as to counteract the decrease in pH value, whereby in total 2.7 l. of 5-N sodium hydroxide solution were added. After the treatment the pH of the solution was equal to 10. The alkaline solution was separated from the hops residue which was washed with 450 l. hot water. This washing water had a pH value equal to 9. The combined alkaline solution and washing water which thus contained the bitter substances gained from the hops residue were added to the wort which was then in usual manner fermented to beer. In the beer obtained the content of bitter substances was 81 mg. per l.

In a comparison brew carried out in the same way but excluding the treatment of the spent hops according to the invention the quantity of hops had to be increased by 33 per cent in order to give the same bitter content in the beer.

*Example 6*

The wet spent hops strained from the wort after the hitherto usual flavouring as described in the beginning of Example 5 was aerated by blowing air through the same in the hops strainer while heating. The residue thus oxidized was then suspended in a sodium carbonate solution of an alkalinity corresponding to a pH of about 9. The solution was then strained off and added to the wort, after which the wort thus flavoured was fermented.

*Example 7*

A beer was brewed in the way stated in Example 5 from a 19,000 l. of strong wort and 55 kg. of a hops of a quality containing 11.0 per cent of bitter substances. In this example, however, the mixture of spent hops, water and sodium hydroxide was not aerated by blowing air through the same, but the air present in the porous residue and in the water together with air introduced by means of the strong agitation were the only oxygen source for oxidation of the bitter acid. In this case the oxidation may be subsequently completed by means of oxygen present in the wort to which the alkaline solution is added. In the beer obtained the content of bitter substances amounted to 90 mg. per l.

This value is to be compared with the value 93 mg. per l. obtained in a parallel brew where the same amount of beer was brewed with 73 kg. of the same hops, but the bitter substances in the residue were not utilized according to the invention.

We claim:

1. In a method of converting the bitter substances non-soluble in water, remaining in hops residue after obtaining from the same the water-soluble bitter substances in a manner shown per se, the step of subjecting the bitter substances of said residue to a partial oxidation so as to convent its content of beta bitter acid into water-soluble soft resins.

2. In a method of converting the bitter substances non-soluble in water, remaining in hops residue after obtaining from the same the water soluble bitter substances in a manner known per se, the steps of oxidizing the residue with oxygen containing gas and afterwards leaching out the water soluble soft resins formed during the oxidation by means of a solvent.

3. In a method of converting the bitter substances non-soluble in water, remaining in hops residue after obtaining from the same the water-soluble bitter substances in a manner known per se, the steps of suspending said residue in a liquid vigorously stirring the suspension so as to cause the surrounding oxygen containing atmosphere to be suspended in the liquid as bubbles, interrupting the stirring when the beta bitter acid has been substantially converted into water soluble soft resin, and separating the liquid from the solid matter.

4. A method as claimed in claim 3 in which the liquid is an alkaline water solution of a pH value of about 9–11.

5. A method as claimed in claim 3 in which the stirring is carried out at an elevated temperature of about 70–80° C.

6. A method as claimed in claim 3 in which the oxidation is accelerated by subjecting the reaction mixture to irradiation with actinic light.

7. A method as claimed in claim 3 in which a catalyst taken from the group consisting of the oxides and hydroxides of copper, iron, manganeses, chromium, cobalt and nickel is added for eccelerating the oxidation.

8. A method as claimed in claim 4 in which the alkaline solution is a sodium hydroxide water solution of a pH of 9–11.

9. A method as claimed in claim 4 in which the alkaline solution is a sodium carbonate water solution.

10. In a method of converting the bitter substances non-soluble in water, remaining in hops residue after obtaining from the same the water-soluble bitter substances in a manner known per se, the steps of suspending said residue in a liquid, forcing an oxygen containing gas through said suspension so as to convert by oxidation its content of non soluble bitter substances into water soluble soft resins, interrupting the supply of oxygen containing gas before any appreciable amount of said bitter substances have been transformed into water insoluble hard resins, and separating the liquid phase containing the water soluble soft resins from the solid matter.

11. A process as claimed in claim 10, in which said liquid is an alkaline water solution of a pH-value of about 9–11.

12. A process as claimed in claim 10 in which said liquid is an organic liquid taken from the group consisting of aliphatic hydrocarbons, halogenated aliphatic hydrocarbons, aliphatic alcohols and ethers.

13. A method as claimed in claim 10 in which the gaseous oxygen is supplied in the form of atmospheric air.

14. A method as claimed in claim 10 in which the oxidation is carried out at an elevated temperature of about 70–80° C.

15. A method as claimed in claim 10 in which the oxidation is accelerated by subjecting the reaction mixture to irradiation with actinic light.

16. A method as claimed in claim 10 in which a catalyst taken from the group consisting of the oxides and hydroxides of copper, iron, manganeses, chromium, cobalt is nickel, and added for accelerating the oxidation.

17. A method of brewing beer while utilizing the non water soluble bitter substances of hops otherwise wasted with the spent hops in which hops are first boiled with wort and then separated from the wort and washed with hot water, said water being added to the wort, the spent hops then being subjected to an oxidizing treatment for converting its content of non soluble bitter substances into water soluble soft resins, said soft resins being dissolved in water and added to the wort which is finally fermented in the usual way.

18. A method of brewing beer while utilizing the non water soluble bitter substances of hops otherwise wasted with the spent hops in which hops is first boiled with wort and then separated from the wort and washed with hot water, said water being added to the wort, the spent hops then being suspended in an alkaline water solution of a pH of 9–11 and subjected to an oxidizing treatment for converting its content of non soluble bitter substances into water soluble soft resins, the alkaline water solution containing said soft resins in solution then being separated from the solid matter and added to the wort which is finally fermented and further treated in a manner known per se.

19. In a method of converting the bitter substances non soluble in water, remaining in spent hops after obtaining from the same the water-soluble bitter substances in a manner known per se, the steps of suspending said spent hops in a liquid, adding an oxygen liberating substance in amounts corresponding to about 100–150 molar per cent of oxygen counted on the content of beta bitter acid in the spent hops, stirring the reaction mixture until the beta bitter acid has been converted into water soluble soft resin, interrupting the stirring and separating the liquid containing said water soluble soft resin from the solid matter.

20. A method as claimed in claim 19 in which the oxygen liberating substance consists of hydrogen peroxide.

TORE RAGNAR NILSSON.
KNUT EVALD SANDEGREN.

References Cited in the file of this patent

UNITED STATES PATENTS

| Number | Name | Date |
| --- | --- | --- |
| 978,476 | Nilson | Dec. 13, 1910 |
| 1,149,704 | Wahl | Aug. 10, 1915 |
| 1,873,167 | Weber | Aug. 23, 1932 |
| 2,163,468 | Rach | June 20, 1939 |